(12) United States Patent
Kizelshteyn et al.

(10) Patent No.: US 11,709,847 B2
(45) Date of Patent: *Jul. 25, 2023

(54) MEDIA CONTENT PLAYBACK FOR A GROUP OF USERS

(71) Applicant: Spotify AB, Stockholm (SE)

(72) Inventors: Mark Kizelshteyn, Brooklyn, NY (US); Andreas Jansson, Brooklyn, NY (US); Tracey Churray, New York, NY (US); Mark Koh, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,359

(22) Filed: Nov. 18, 2021

(65) Prior Publication Data

US 2022/0222262 A1 Jul. 14, 2022

Related U.S. Application Data

(63) Continuation of application No. 16/662,589, filed on Oct. 24, 2019, now Pat. No. 11,210,303.

(51) Int. Cl.
*G06F 16/2457* (2019.01)
*G06F 16/41* (2019.01)
*G06F 16/44* (2019.01)
*H04N 21/2668* (2011.01)
*H04N 21/262* (2011.01)

(52) U.S. Cl.
CPC ........ *G06F 16/24578* (2019.01); *G06F 16/41* (2019.01); *G06F 16/44* (2019.01); *H04N 21/2668* (2013.01); *H04N 21/26258* (2013.01)

(58) Field of Classification Search
None
See application file for complete search history.

(56) References Cited

U.S. PATENT DOCUMENTS

| | | | |
|---|---|---|---|
| 10,928,998 B2 * | 2/2021 | Chase | G06F 3/167 |
| 10,965,976 B2 * | 3/2021 | Cramer | H04N 21/42203 |
| 10,977,296 B1 * | 4/2021 | Kizelshteyn | G06F 16/433 |
| 11,210,303 B2 * | 12/2021 | Kizelshteyn | G06F 16/24578 |
| 11,386,138 B2 * | 7/2022 | Kizelshteyn | H04L 65/612 |
| 11,574,627 B2 * | 2/2023 | Jansson | G10L 15/083 |
| 2005/0038819 A1 | 2/2005 | Hicken | |
| 2007/0244880 A1 | 10/2007 | Martin et al. | |
| 2008/0091717 A1 | 4/2008 | Garbow et al. | |
| 2008/0096726 A1 | 4/2008 | Riley | |
| 2011/0125763 A1 | 5/2011 | Takanen et al. | |
| 2011/0295843 A1 | 12/2011 | Ingrassia, Jr. et al. | |
| 2013/0311464 A1 | 11/2013 | Nix et al. | |
| 2015/0331940 A1 | 11/2015 | Manning | |
| 2017/0060888 A1 | 3/2017 | Al Hassanat | |
| 2019/0065468 A1 | 2/2019 | Nazer | |

(Continued)

OTHER PUBLICATIONS

Sharifi, Matthew et al., "Automatic Playlist Creation for Group Events," Technical Disclosure Commons (Jun. 13, 2017), 11 pages, Available Online at: https://www.tdcommons.org/dpubs_series/555.

*Primary Examiner* — Kim T Nguyen
(74) *Attorney, Agent, or Firm* — Merchant & Gould P.C.

(57) ABSTRACT

Methods, systems, and computer programs for generating a playlist of media content items for a group of users. Media content items listened to by the selected users are compared to an average user taste profile to select media content items for playback to the group of users.

20 Claims, 11 Drawing Sheets

(56) References Cited

U.S. PATENT DOCUMENTS

| | | |
|---|---|---|
| 2019/0171753 A1 | 6/2019 | Teng |
| 2020/0178018 A1* | 6/2020 | Bittner |
| 2020/0192558 A1* | 6/2020 | Chase ................ G06F 3/04847 |
| 2020/0278997 A1* | 9/2020 | Lamere ................ G06F 16/632 |
| 2020/0314474 A1* | 10/2020 | Cramer .............. H04N 21/2668 |
| 2020/0394213 A1 | 12/2020 | Li |
| 2021/0124747 A1* | 4/2021 | Kizelshteyn ..... H04N 21/44227 |
| 2021/0176512 A1* | 6/2021 | Cramer .............. H04N 21/2668 |
| 2021/0311982 A1* | 10/2021 | Kizelshteyn .......... G06F 16/433 |
| 2022/0044672 A1* | 2/2022 | Jansson ................ G10L 15/144 |
| 2022/0222262 A1* | 7/2022 | Kizelshteyn ......... H04N 21/252 |
| 2022/0365960 A1* | 11/2022 | Kizelshteyn .......... H04L 65/612 |

\* cited by examiner

US 11,709,847 B2

MEDIA CONTENT PLAYBACK FOR A GROUP OF USERS

CROSS-REFERENCE TO RELATED APPLICATIONS

This application is a Continuation of U.S. patent application Ser. No. 16/662,589, filed Oct. 24, 2019, titled MEDIA CONTENT PLAYBACK FOR A GROUP OF USERS, the disclosure of which is hereby incorporated by reference in its entirety. To the extent appropriate, a claim of priority is made to the above-disclosed application.

BACKGROUND

Media distribution (e.g. streaming) platforms have allowed consumers unprecedented access to large catalogs of media content, such as songs and videos. It is common for these platforms to include features that recommend media to users based on a designated style of use, for example, songs suitable for a certain style of dance, or videos suitable for a certain activity such as an exercise workout or a cooking lesson.

A problem with such audio players and applications is that they do not provide a way for multiple users to have input into a single playlist. Generally, one user controls the creation of a playlist or a queue of media content items to be played in a group setting. Often times, when multiple users are gathered together and desire to listen to music or consume other media content items, the other users may not have any involvement in the selection of what is being played.

SUMMARY

In general terms, this disclosure is directed to media content playback for a group of users. In some embodiments, and by non-limiting example, a group playlist is generated that is composed of media content items selected for a specific group of users.

One aspect is a method of generating a playlist of media content items for a group of users, the method comprising: identifying a first user of the group and determining a first user taste profile; identifying a second user of the group and determining a second user taste profile; generating a group taste profile based on at least the first and second user taste profiles, and generating a group taste profile vector in a multi-dimensional vector space representing taste profile of the group; generating a list of candidate media content items selected from at least a first user media consumption history and a second user media consumption history, and generating media content item vectors for each of the media content items in the multi-dimensional vector space; for each media content item in the list of candidate media content items, computing a distance between the respective media content item vector and the group taste profile vector, and ranking the list of candidate media content items based on the distance; and generating a playlist selected from the ranked list of candidate media content items.

Another aspect is a system comprising non-transitory memory and at least one processing device in data communication with the memory, wherein the memory stores data instructions that, when executed by the at least one processing device, cause the at least one processing device to: receive a request to generate a group playlist; identify a first user of the group and determine a first user taste profile; receive a selection of at least one other user of the group and determine a user taste profile for each other user of the group; generate a group taste profile based on an average of the first user taste profile and the user taste profiles for each other user of the group, and represent the group user taste profile as a group profile vector in a multi-dimensional vector space, the dimensions of the multi-dimensional vector space corresponding to characteristics of media content; generate a list of candidate media content items from media consumption histories of the first user and the at least one other user of the group, and generate media content item vectors for each of the media content items of the list of candidate media content items in the multi-dimensional vector space; rank the media content items of the list of candidate media content items based on a distance between the respective media content item vector and the group taste profile vector; and generate the group playlist by selecting media content items from the ranked list of candidate media content items.

DETAILED DESCRIPTION

Figure 1:
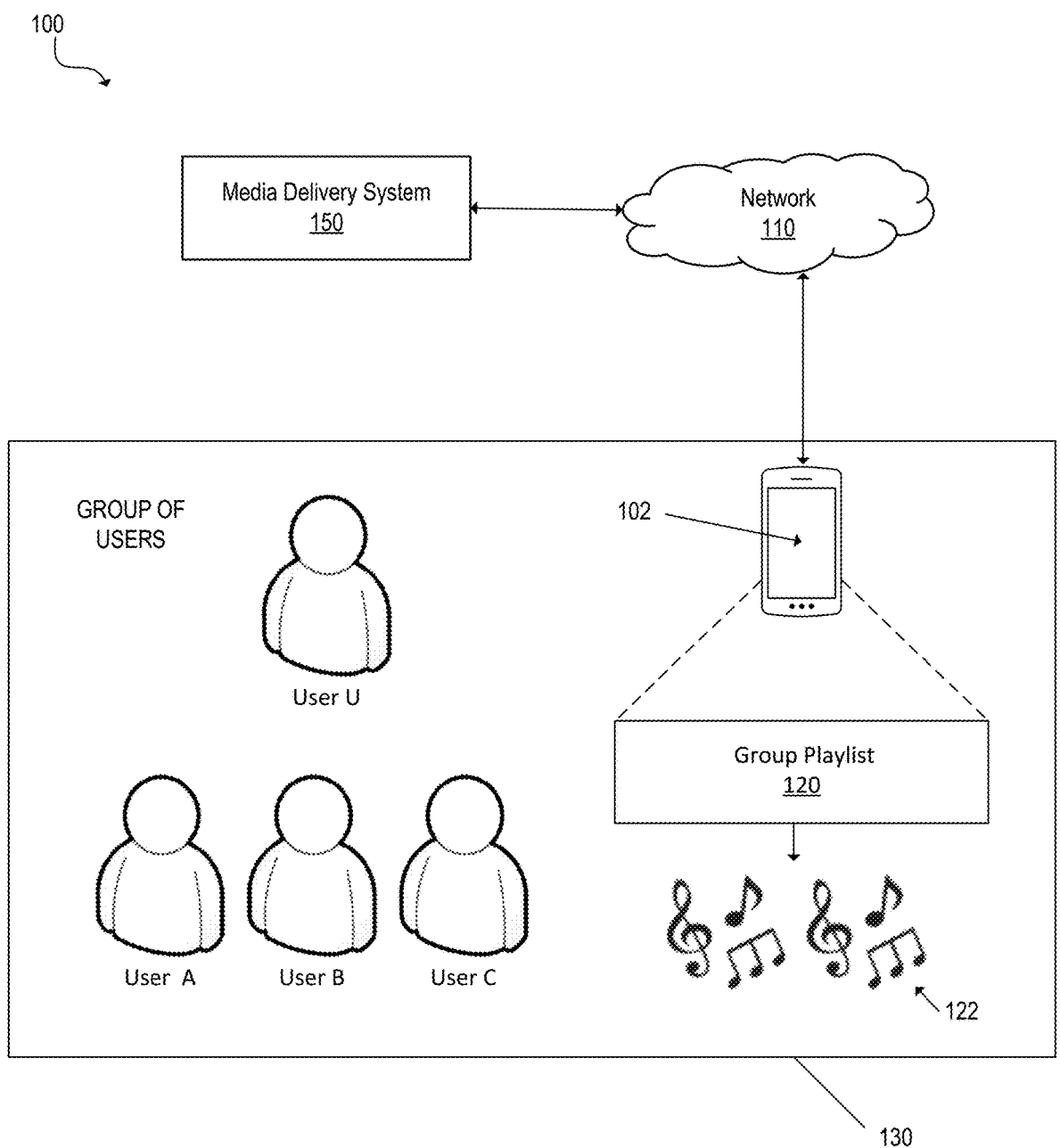
FIG. 1 is a schematic diagram illustrating an example media playback system for generating and playing a group playlist for a group of users.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A playlist can be generated that includes a list of media content selected for playback to a group of people (herein often referred to as "users"). Media content items can include audio and video content. Examples of audio content include music, podcasts, audiobooks, and other audible content. Examples of video content include movies, music videos, television programs, and other visible media content. In many cases, video content also includes audio content.

FIG. 1 is a schematic diagram illustrating an example media playback system 100 for generating and playing a playlist 120 for a group of users 130. In this example, the media playback system 100 includes a media playback device 102 and a media delivery system 150. The media playback device 102 and the media delivery system 150 can communicate with each other over a network 110. Also shown in FIG. 1 are a group of users 130, including a primary user U who is at a gathering with other users A, B, and C.

In some embodiments, the group of users includes a group of people who are gathered together at a common location, such as at a common gathering such as a party, meeting, dinner, or other event. In some embodiments the people are physically located together, such as being in close proximity to each other (e.g., in the same building, room, or area). In other possible embodiments, at least some of the users can be gathered together virtually, such as through a telephone, video conferencing, or online gaming system. The group of users is gathered together in such a way that they can each hear media content played by the media playback system 100, through one or more media playback devices 102.

The media playback system 100 operates to generate a group playlist 120 suitable for the group of users 130, such as by taking into consideration the listening tastes of each of the users U, A, B, and C. In some embodiments the listening tastes can include both likes and dislikes, so that media content that the users are likely to collectively enjoy is selected for inclusion in the group playlist 120, whereas media content that at least some of the users are not likely to enjoy is excluded from the group playlist 120.

In some embodiments the media playback device 102 is a computing device, such as a user device, that is usable by at least the primary user U and operable to generate, or receive, and playback the group playlist 120. The media playback device 102 can include visual components (e.g., displays for output and cameras for input), audio components (e.g., speakers for output and microphones for input), tactile components (e.g., buttons, keyboard, mouse, touch-sensitive display, etc. for input), and combinations thereof.

Some embodiments include a media delivery system 150 that provides media content to the media playback device 102, such as by streaming the media content items across a network 110, such as the Internet.

The media playback device 102 receives input from a user U and provides output, such as by playing media content items 122 to the user U. The media playback device 102 can include visual components (e.g., displays for output and cameras for input), audio components (e.g., speakers for output and microphones for input), tactile components (e.g., haptic feedback actuators for output and buttons for input), and combinations thereof.

The network 110 enables data communication between devices, such as between the media playback device 102 and the media delivery system 150. The network 110 can include any type of wired or wireless data communication network, and combinations thereof. Examples of the network 110 include the Internet, an intranet, a wide area network (WAN), a local area network (LAN), and a virtual private network (VPN), cellular network connections, WI-FI networks using protocols such as 802.11a, b, g, n and/or ac, or other data communication channels or protocols.

In some embodiments the media delivery system 150 includes a server that is a computing device remote from the media playback device 102. In many examples, the media delivery system 150 is a computing device of a media delivery system, such as a media content provider (e.g., a media streaming service). In an example the media delivery system 150 streams, progressively downloads, or otherwise communicates media content items to the media playback device 102 for playback.

In some embodiments, media delivery system 150 includes multiple server devices. The multiple server devices can be owned, managed, and/or controlled by the same or separate entities. Various actions performed by one or more servers can include analyzing user communications, performing party-specific actions, accessing and/or transmitting media content, and the like.

It should be appreciated that the media playback device 102 need not be a single physical unit or structure but could itself comprise a system of interconnected hardware, firmware, and software. Thus, for example, the media playback device 102 can be a combination of a smartphone or specialized hand-held or vehicle-mountable device that is connected (through a hard connection or wireless connection) to an automobile's speakers, or other audio output device. As another example, the media playback device 102 can include a Bluetooth™ connected speaker. In other examples, the media playback device 102 is communicatively linked or linkable to hardware in the user's environment such as a home, an office, vehicle, or any location where media playback could be desirable, etc.

FIG. 1 also shows an example media playback system 100 in which a group playlist is generated and played back to a group of users 130. In this example, the primary user U selects to generate a group playlist 120. The user U selects the other users to be included, which generally include the other users in a gathering, for example, user A, user B, and user C. (The group of users 130 is sometimes referred to herein as a group of participating users, and the users of the group of users 130 are sometimes referred to herein as participating users.) Then the playlist 120 is played through the media playback device 102 for the user U and participating users. A gathering of people generally refers to users in the same physical location, for example, a party, a car, or other gathering of people. In other example, a gathering may be a virtual gathering, such a telephone or video conference or through an online gaming system.

In some embodiments, the media playback device 102 is a computing device, such as a handheld entertainment device, smartphone, tablet, watch, wearable device, or any other type of device capable of playing media content. In yet other embodiments, the media playback device 102 is or includes an in-dash vehicle computer, laptop computer, desktop computer, television, gaming console, set-top box, network appliance, BLU-RAY DISC player, DVD player, media player, stereo, or radio.

Figure 2:
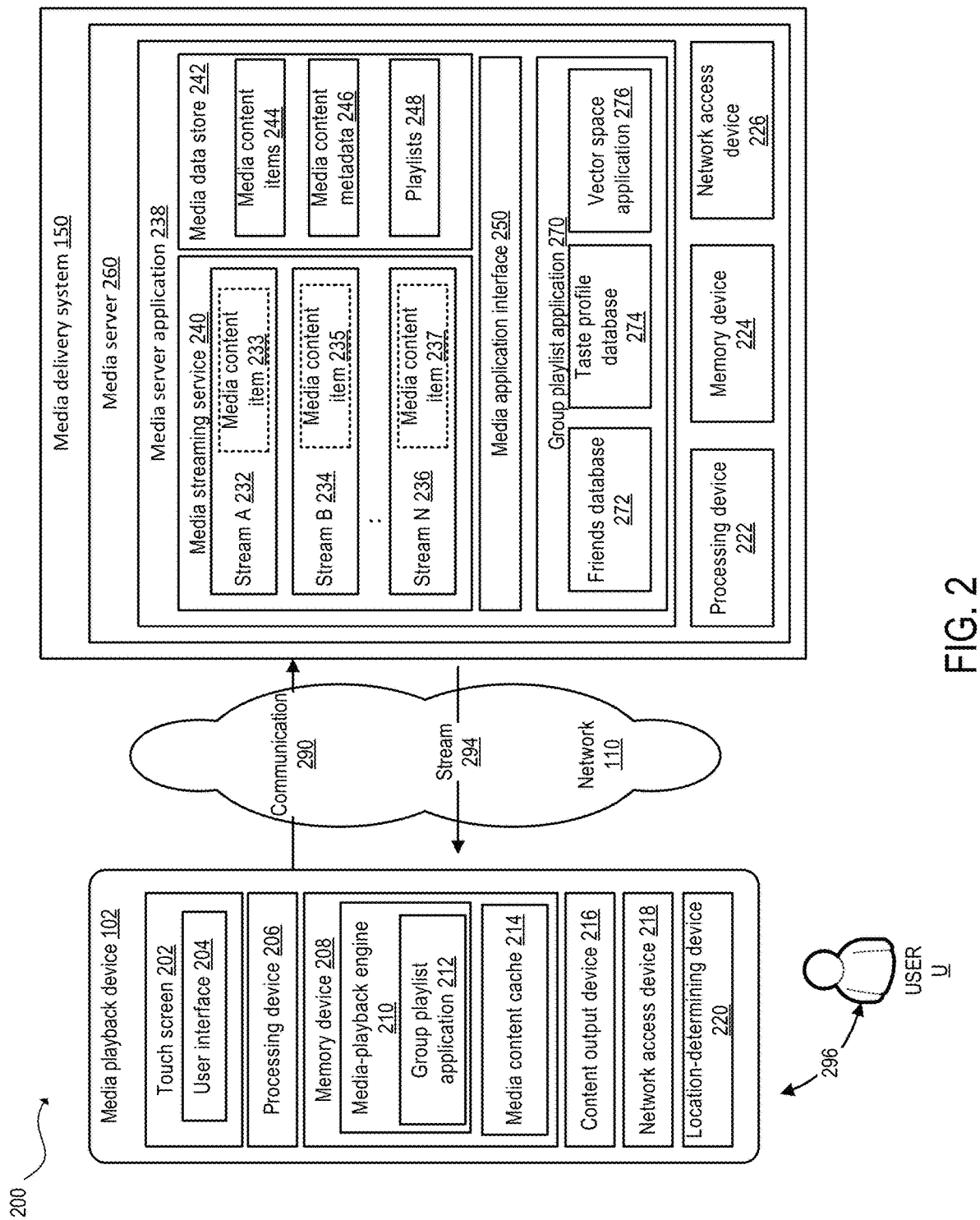
FIG. 2 is a schematic block diagram illustrating another example of the media playback system shown in FIG. 1.

FIG. 2 is a schematic block diagram of another example of the media playback system 100, shown in FIG. 1, which includes the media playback device 102 and the media delivery system 150, in data communication across the network 110.

Media playback device 102 can issue requests to access media content at a media server 260, for example, to stream music, video, or other forms of media content to media playback device 102. In response, the media server 260 can populate a media content buffer with corresponding items of media content. The media server 260 can also communicate the selected media content to media playback device 102. Alternatively, in some embodiments, the media playback device 102 plays media content items stored locally on the media playback device 102. Further, in at least some embodiments, the media playback device 102 plays media content items that are stored locally as well as media content items downloaded or streamed from another system.

In many examples, the media playback device 102 includes one or more processor devices and a computer-readable medium storage device coupled to the one or more processor devices. The computer-readable medium storage device includes instructions that, when executed by the one or more processor devices, cause the one or more processor devices to perform one or more of the various methods, operations, or processes described herein.

Although for purposes of illustration a media playback device 102 and media server 260 are shown, media delivery system 150 can support simultaneous use by a plurality of user devices 102. Similarly, media playback device 102 can access media content items 233, 235, 237 provided by a plurality of media servers 260, or switch between different media streams 232, 234, 236 provided by one or more media servers 260.

In at least some embodiments, the media playback device 102 includes a touch screen 202, a processing device 206, a memory device 208, a content output device 216, a network access device 218, and a location-determining device 220. Other embodiments may include additional, different, or fewer components. For example, some embodiments do not include one or more of the location-determining device 220 or the touch screen 202.

The location-determining device 220 is a device that determines the location of the media playback device 102. In some embodiments, the location-determining device 220 uses one or more of the following technologies: Global Positioning System (GPS) technology that may receive GPS signals from satellites, cellular triangulation technology, network-based location identification technology, wireless network (e.g., WI-FI) positioning systems technology, and combinations thereof.

The touch screen 202 operates to receive inputs 296 from a selector (e.g., a finger, stylus, etc.) controlled by the user U. In some embodiments, the touch screen 202 operates as both a display device and a user input device. In some embodiments, the touch screen 202 detects inputs based on one or both of touches and near-touches. In some embodiments, the touch screen 202 displays a user interface 204 for interacting with the media playback device 102. As noted above, some embodiments do not include a touch screen 202. Some embodiments include a display device and one or more separate user interface devices. Further, some embodiments do not include a display device.

The user interface 204 is adapted to display media options, for example as an array of media tiles, thumbnails, or other formats, and can determine a user interaction or input. Selecting a particular media option, for example a particular media tile or thumbnail, can be used as a command by a user and/or the media device, to the media server, to download, stream or otherwise access a corresponding particular media content item or stream of media content.

In some embodiments, the processing device 206 comprises one or more central processing units (CPU). In other embodiments, the processing device 206 additionally or alternatively includes one or more digital signal processors, field-programmable gate arrays, or other electronic circuitry.

The memory device 208 operates to store data and instructions. In some embodiments, the memory device 208 stores instructions for a media-playback engine 210 that includes the group playlist application 212. In some embodiments, the media-playback engine 210 selects and plays back media content and generates interfaces for selecting and playing back media content items.

The media-playback engine 210 includes a group playlist application 212. The group playlist application 212 communicates with user interface 204 to receive a request to generate a group playlist. The group playlist application 212 communicates with the media server application 238 to identify media content items used to generate the playlist.

The group playlist application 212 includes one or more hardware and/or software components operative to provide personalized playlist functionality. Playlist management functionality includes one or more of selecting users, selecting one or more individual songs, removing one or more individual songs, and playing playlists, among other functionality. In an example, the group playlist application 212 receives a command from a first user and executes a command based thereon. Many operations performed by the group playlist application 212 include interacting with the media server application 238. The group playlist application 270 may also be located at the media server application 238, which is described in more detail below.

Some embodiments of the memory device 208 also include a media content cache 214. The media content cache 214 stores media content items, such as media content items that have been previously received from the media delivery system 150. The media content items stored in the media content cache 214 may be stored in an encrypted or unencrypted format. The media content cache 214 can also store decryption keys for some or all of the media content items that are stored in an encrypted format. The media content cache 214 can also store metadata about media content items such as title, artist name, album name, length, genre, mood, era, etc. The media content cache 214 can also store playback information about the media content items, such as the number of times the user has requested to playback the media content item or the current location of playback (e.g., when the media content item is an audiobook, podcast, or the like from which a user may wish to resume playback).

The memory device 208 typically includes at least some form of computer-readable media. Computer readable media includes any available media that can be accessed by the media playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, BLU-RAY DISCS, digital versatile discs or other optical storage, magnetic cassettes, magnetic tape, magnetic disk storage or other magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 216 operates to output media content. In some embodiments, the content output device 216 generates media output for the user U and other users in the group. Examples of the content output device 216 include a speaker assembly comprising one or more speakers, an audio output jack, a Bluetooth™ transmitter, a display panel, and a video output jack. Other embodiments are possible as well. For example, the content output device 216 may transmit a signal through the audio output jack or Bluetooth™ transmitter that can be used to reproduce an audio signal by a connected or paired device such as headphones, a speaker system, or a vehicle head unit.

The network access device 218 operates to communicate with other computing devices over one or more networks, such as the network 110. Examples of the network access device include one or more wired network interfaces and wireless network interfaces. Examples of wireless network interfaces include infrared, Bluetooth™ wireless technology, 802.11a/b/g/n/ac, and cellular or other radio frequency interfaces.

The network 110 is an electronic communication network that facilitates communication between the media playback device 102 and the media delivery system 150. An electronic communication network includes a set of computing devices and links between the computing devices. The computing devices in the network use the links to enable communication among the computing devices in the network. The network 110 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 110 includes various types of links. For example, the network 110 can include wired and/or wireless links, including Bluetooth™, ultra-wideband (UWB), 802.11, ZIGBEE, cellular, and other types of wireless links. Furthermore, in various embodiments, the network 110 is implemented at various scales. For example, the network 110 can be implemented as one or more vehicle area networks, local area networks (LANs), metropolitan area networks, subnets, wide area networks (such as the Internet), or can be implemented at another scale. Further, in some embodiments, the network 110 includes multiple networks, which may be of the same type or of multiple different types.

The media delivery system 150 comprises one or more computing devices and provides media content items to the media playback device 102 and, in some embodiments, other media-playback devices as well. The media delivery system 150 includes a media server 260. Although FIG. 2 shows a single media server 260, some embodiments include multiple media servers. In these embodiments, each of the multiple media servers may be identical or similar to that shown in FIG. 2 and may provide similar functionality (e.g., to provide greater capacity and redundancy, or to provide services from multiple geographic locations). Alternatively, in some embodiments, some of the multiple media servers may perform specialized functions to provide specialized services (e.g., the group playlist application 270 can be provided by a specialized server.

The media server 260 transmits stream media 294 to media-playback devices such as the media playback device 102. In some embodiments, the media server 260 includes a media server application 238, media application interface 250, group playlist application 270, a processing device 222, a memory device 224, and a network access device 226. The processing device 222, memory device 224, and network access device 226 may be similar to the processing device 206, memory device 208, and network access device 218 respectively, which have each been previously described.

In some embodiments, the media server application 238 streams music or other audio, video, or other forms of media content. The media server application 238 includes a media streaming service 240, a media data store 242, a media application interface 250, and a group playlist application 270. The media streaming service 240 operates to buffer media content such as media content items 233, 235, and 237, for streaming through one or more streams 232, 234, and 236, as stream media 294.

Media server 260 can provide a subscription-based media streaming service 240, for which media playback device 102, or the user, can have an associated account and credentials, and which enable the media playback device 102 to communicate with and receive content from the media server 260. A received media-access request from the media playback device 102 can include information such as, for example, a network address, which identifies the media playback device 102 to which the media server 260 should stream or otherwise provide media content items 233, 235, 237, in response to processing the media-access request.

The media application interface 250 can receive requests or other communication from media playback device 102 or other systems, to retrieve media content items from the media server 260. For example, the media application interface 250 receives communication 290 from the media-playback engine 210.

In some embodiments, the media data store 242 stores media content items 244, media content metadata 246, and playlists 248. The media data store 242 may comprise one or more databases and file systems. As noted above, the media content items 244 may be audio, video, or any other type of media content, which may be stored in any format for storing media content.

Media content items 244 can include media content, for example, music, songs, videos, movies, or other media content, together with metadata describing that media content.

The media content metadata 246 operates to provide various information associated with the media content items 244. In some embodiments, the media content metadata 246 includes one or more of title, artist name, album name, length, genre, mood, era, etc. The metadata can be used to enable users and the media playback device 102 to search within repositories of media content, to locate particular media content items 244.

The playlists 248 operate to identify collections of one or more of the media content items 244 and in some embodiments, the playlists 248 identify a group of the media content items 244 in a particular order. In other embodiments, the playlists 248 merely identify a group of the media content items 244 without specifying a particular order. The playlists 248 may include user-generated playlists, which may be available to a particular user, a group of users, or to the public, and computer-generated playlists that are generated automatically.

The group playlist application 212 can receive requests or other communication 290 from media playback devices 102 or other systems to generate and/or retrieve a group playlist 120 that is custom generated for playback to the particular group of users 130. In some embodiments, group playlist application 212 includes one or more of a friends database 272, taste profile database 274, and vector space application 276.

The friends database 272 can store information related to registered users of the media delivery system 150. For example, the friends database 272 stores connection information of users. In another example, friends database 272 can communicate with other social media platforms to identify and recommend new connections to users, or to identify connections between users.

The taste profile database 274 maintains the taste profile information for each user. Taste profiles are determined, for example, based on the user media consumption history. The media consumption history of the user includes, for example, the songs, artists, genres, and other similar attributes of media content that the user has listened to or otherwise consumed. In some embodiments the taste profile of each user includes the user's media consumption history. The media consumption history includes a list of media content items that have been previously consumed (such as, listened to or watched) by the user. In come embodiments the media consumption history is limited to a time range, such as within the past hour, a number of days, a number of years, and the like. Or, the media consumption history can be filtered to return only media content items consumed during the time range.

The vector space application 276 receives or obtains user taste profile information and media content item information. The vector space application 276 can generate and analyze vectors for individual user taste profiles, average user taste profiles, and media content items in a multi-dimensional vector space. The multi-dimensional vector space can include many different dimensions, where each dimension represents a different characteristic of media content and musical taste, such that plotting of the vectors within the multi-dimensional vector space allows for identification and analysis of similarities and differences between the characteristics of media content and of musical taste profiles. In some embodiments the vector space application 276 includes algorithms for computing values representative of the similarity and differences between vectors, such as by computing distances between the vectors in the vector space. In some embodiments the vector space application 276 utilizes cosine difference or cosine similarity algorithms to compute cosine difference or cosine similarity values.

Each of the media playback device 102 and the media delivery system 150 can include additional physical computer or hardware resources. In at least some embodiments, the media playback device 102 communicates with the media delivery system 150 via the network 110.

Although in FIG. 2 only a single media playback device 102 and media delivery system 150 are shown, in accordance with some embodiments, the media delivery system 150 can support the simultaneous use of multiple media-playback devices, and the media-playback device can simultaneously access media content from multiple media-delivery systems. Additionally, although FIG. 2 illustrates a streaming media based system for media playback, other embodiments are possible as well. For example, in some embodiments, the media playback device 102 includes the media data store 242 and the media playback device 102 is configured to select and playback media content items without accessing the media delivery system 150. Further, in some embodiments, the media playback device 102 operates to store previously streamed media content items in a local media data store (e.g., the media content cache 214).

In at least some embodiments, the media delivery system 150 can be used to stream, progressively download, or otherwise communicate music, other audio, video, or other forms of media content items to the media playback device 102 for playback during travel on the media playback device 102. In accordance with an embodiment, a user U can direct input 296 to the user interface 204 to issue requests, for example, to generate a group playlist for playback on the media playback device 102.

Figure 3:
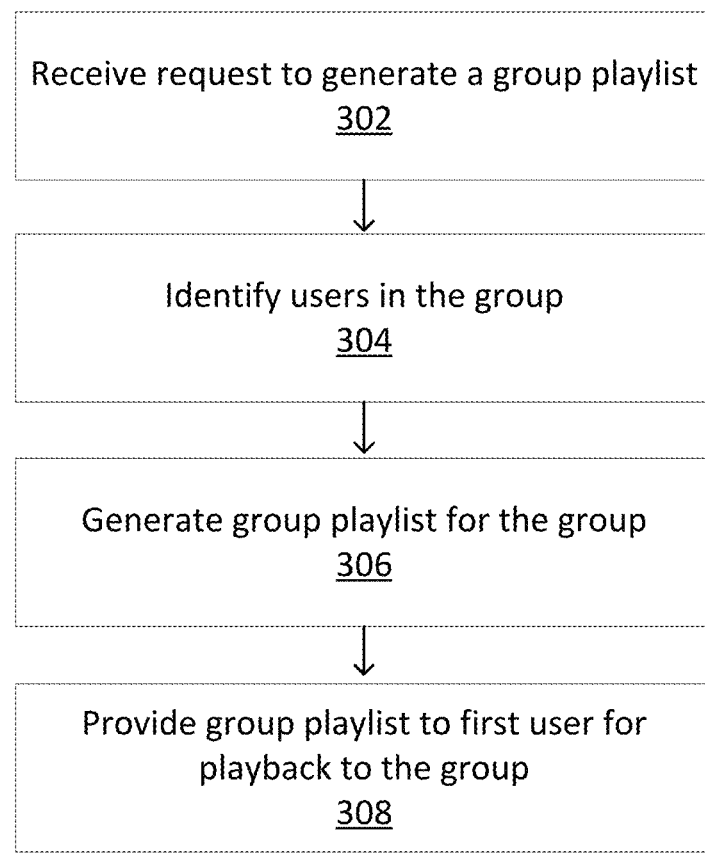
FIG. 3 illustrates an example method of generating the group playlist shown in FIG. 1.

FIG. 3 illustrates an example method 300 of generating a group playlist 120, shown in FIG. 1. In the illustrated example, the method 300 includes operations 302, 304, 306, and 308.

The group playlist 120 is generated for playback to the group of users 130 (shown in FIG. 1). The group of users 130 can include the primary user U, also referred to herein as a first user, and other users, such as users A, B, and C.

Figure 4:
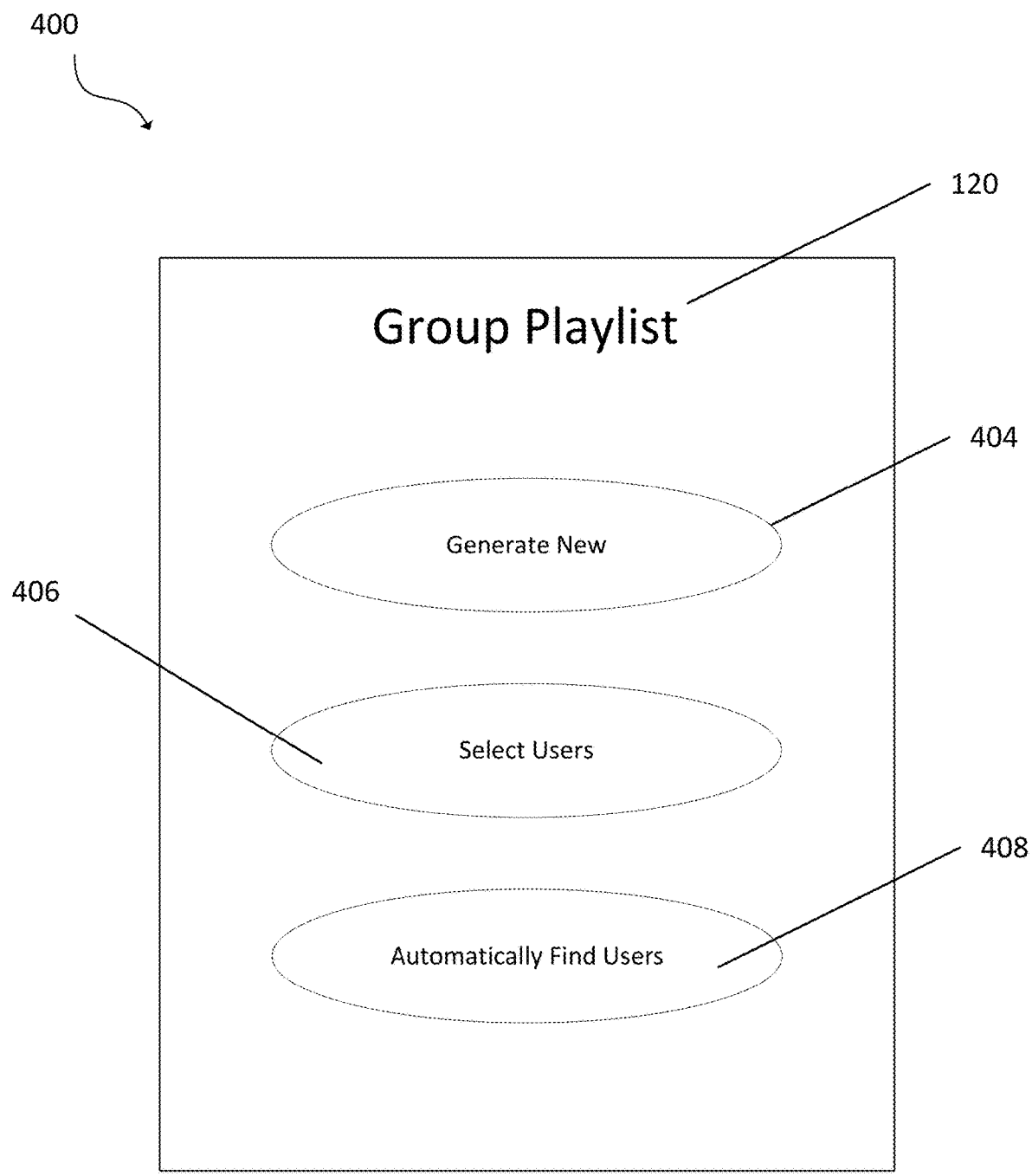
FIG. 4 illustrates an example user interface for generating a group playlist.

At the operation 302, a request is received to generate a group playlist 120. For example, the first user selects an option in a user interface to request the group playlist. The request may be received by a user interface such as shown in FIG. 4.

In an alternative embodiment, when the music streaming application detects that other users are nearby the first user, the group playlist application may present the option to generate the group playlist to the first user. For example, the group playlist application may detect that other users are within a wireless communication (e.g., Bluetooth™) range of the first user or within a distance of the first user's media playback device 102, and then prompt the first user with the option to generate the group playlist. The user interface can be graphical (on a display device) or vocal (through a voice interface), for example.

At the operation 304, the group of users is identified. In a first embodiment, a first user is able to select at least one other. In an example, up to four other users are selected. In another embodiment, more than four other users can be selected. In yet another embodiment, a first user is presented with a list of users that are in proximity to the first user, such as within Bluetooth™ range, or within a distance of the first user's media playback device 102, and the first user may select any of those users. In yet another embodiment, the first user may opt to have the application select the users that are in proximity. In another embodiment the selection of the group of users occurs automatically.

In another embodiment, when the music streaming application detects that other users are nearby the first user, the group playlist application automatically generates the group playlist and presents it to a first user for playback. For example, other users may be detected using Bluetooth™ capabilities of the media playback device 102, or may be detected with another location-determining device, such as GPS, and the like.

At the operation 306, the group playlist is generated including a plurality of media content items. The group playlist is a compilation of media content items selected based on the users in the group of users. For example, based on the media consumption history of the selected users or the user taste profiles. As described in detail below, the media content items selected for the playlist are selected so that they will be enjoyed by all of the users in the group.

An example of operation 306 is illustrated and described in further detail with reference to FIGS. 7-8.

At the operation 308, the group playlist is provided to the first user for playback to the group of users. In an embodiment, only the first user is provided with the playlist. In another embodiment, all the participating users are provided with the playlist. The playlist may be transitory, and is not permanently saved for the first user, unless the first user selects an option to save the playlist. Alternatively, the playlist may be added to the first user and/or all participating users' playlist databases.

FIG. 4 illustrates an example user interface 400 presented to a first user for generating a group playlist 120. In this example, the user interface 400 includes selectable options 404, 406, and 408.

The option 404 is provided and can be selected by the user to request the generation of a group playlist 120. The selection of option 404 is an example of operation 302 in FIG. 3 for receiving a request to generate the group playlist 120.

The option 406 is provided and can be selected to initiate the selection of other users in the group. In some embodiments, upon selection of option 406, a user interface 500 is displayed as shown in FIG. 5, to allow the first user to select the other users in the group.

Alternatively, the option 408 is provided and can be selected to initiate automatic finding of users, such as based on their proximity to the first user's media playback device 102.

Figure 5:
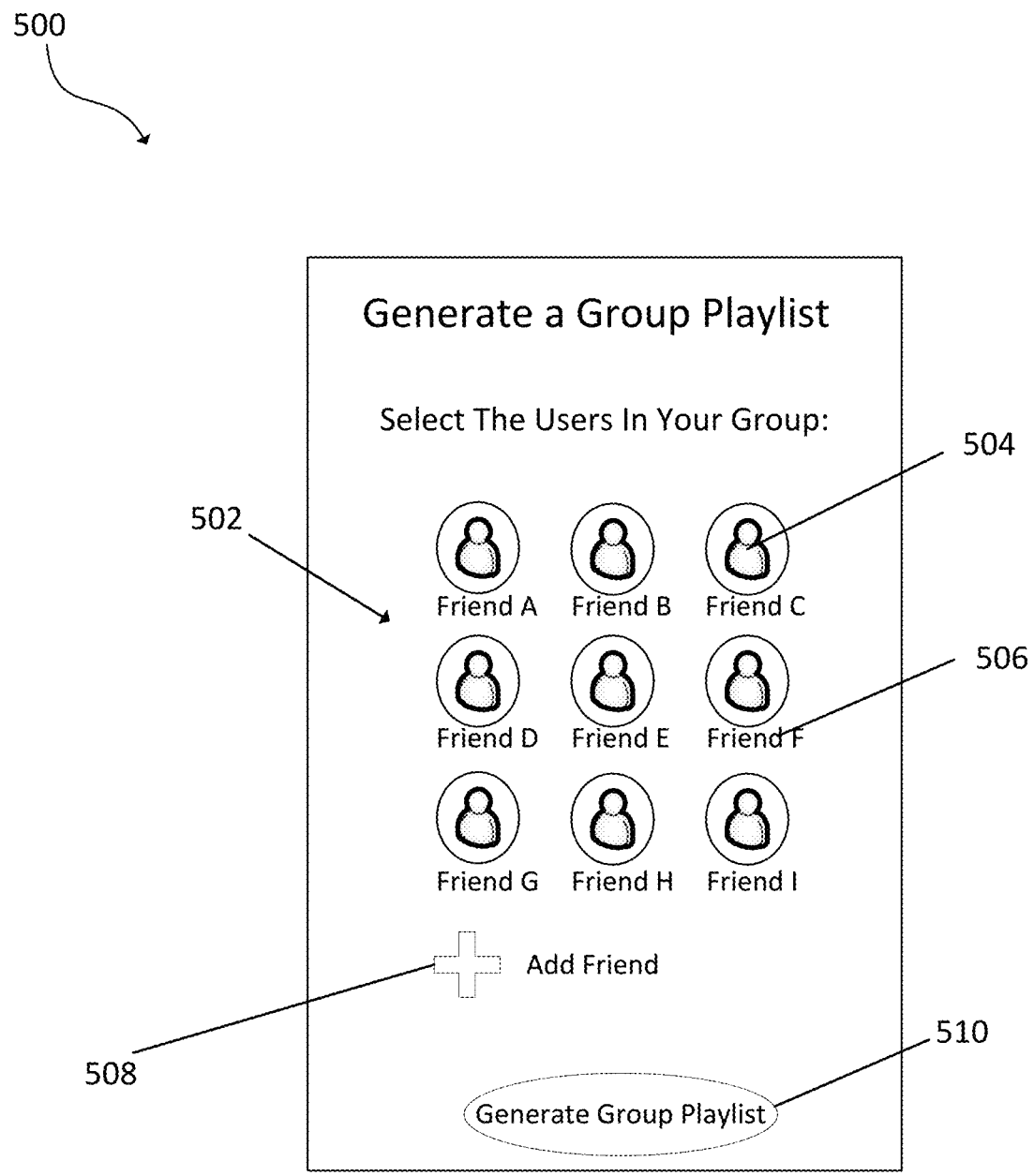
FIG. 5 illustrates an example user interface for selecting a group of users for the group playlist.

FIG. 5 illustrates an example user interface 500 for selecting a group of users for whom to generate the group playlist 120, as described herein.

In the example shown, a display 502 of multiple users is presented for the first user to select from. Each user may be represented by a pictorial representation 504 and/or a name 506, for example.

In some embodiments the display 502 of users includes the first user's most frequent or closest connections. In another embodiment, the display 502 includes a list of the users that are currently in proximity to the first user. Proximity can be detected, for example, based on a GPS location, or based on wireless communications between mobile computing devices associated with each user (such as the media playback device 102 or another computing device, such as a smartphone, smartwatch, and the like). In yet another possible embodiment, the display 502 includes a subset of users who are connected to the first user, and that have a closest individual taste profile to the first user. Combinations of these are also possible (e.g., those in proximity and having a closest individual taste profile).

The pictorial representations 504 and names 506 are selectable, and upon selection the corresponding user is added to the group. In some embodiments the selected users are highlighted or otherwise visually indicated in the display 502, so that the user can review the users that are already selected. In another embodiment, a list of the users that have been selected is displayed.

The user interface 500 can also include a search button 508, which allows the first user to search for other users that are not initially shown in the display 502.

The first user may select the set of users to include in the group from the display 502, and then select the generate group playlist button 510 when done. In some embodiments the number of users in the group is limited, such as in a range from 2 to 15 users, and as one example, a maximum of four users.

Figure 6:
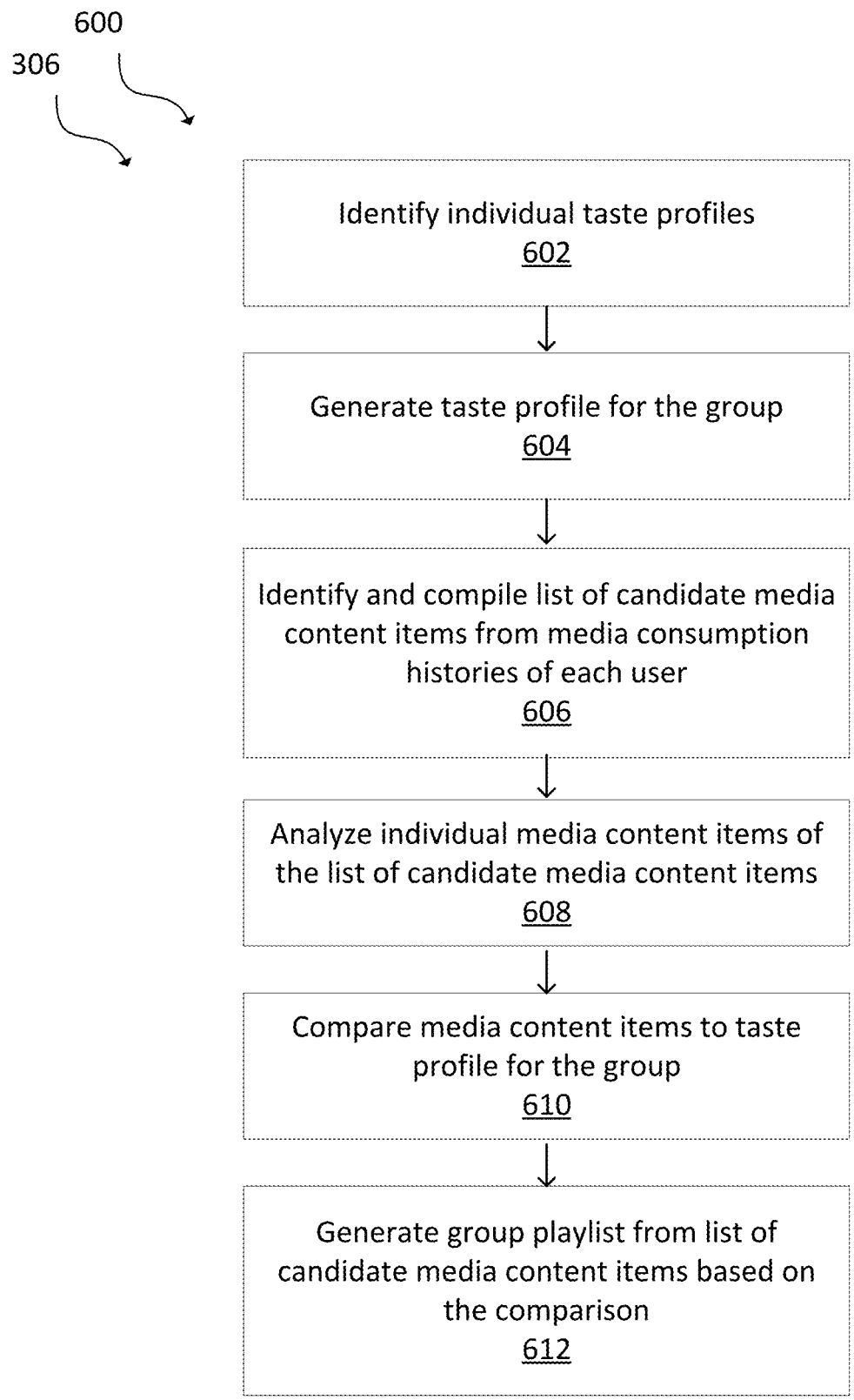
FIG. 6 illustrates an example method of generating a group playlist.

FIG. 6 illustrates an example method 600 of generating a group playlist 120. The method 600 is an example of the operation 306 shown in FIG. 3. The example method 600 includes operations 602, 604, 606, 608, 610, and 612. Other embodiments have more, fewer, or different operations than the example shown in FIG. 6.

In some embodiments the method 600 is performed at a server, such as the media server 260, and more specifically for example as part of the group playlist application 270, shown in FIG. 2. In another possible embodiment, the method 600 is performed by a media playback device 102, which may be, for example, part of the group playlist application 212. The operations can also be distributed across multiple servers 260 or devices 102 as well.

After a group of users 130 has been identified, such as using the user interface 400 shown in FIG. 4, the method 600 is performed to generate a group playlist 120 containing media content items selected based on the group of users 130.

In one example, the method 600 begins by analyzing the taste profiles of each of the individual users in the group of users 130. The operation 602 is performed to identify the individual taste profiles of each user. The individual taste profiles store data describing taste preferences of the user. Examples of taste preferences include media content items previously consumed, names of artists whose media content items are most frequently consumed, genres of media content items most frequently consumed, a diversity of media content items consumed (e.g., representative of whether the user prefers only a single type of music, or whether the user has a wide and varied taste in music). As another example, the individual taste profile can be based on or include the media consumption history of the user, such as a list of media content items previously consumed by the user in the media playback system 100. Individual taste profiles are described in further detail herein with reference to FIGS. 7-8.

As another example, the operation 602 involves generating an individual taste profile vector, which is a vector representation of the individual taste profile in a multi-dimensional vector space. The individual taste profile vector can be generated, for example, by first generating media content item vectors associated with media content items in the media consumption history of the user, and then generating an average media content item vector as the individual taste profile vector of the user. Other factors or algorithms can also be used in generating the individual taste profile vector. For example, in some embodiments the media consumption history is limited by a particular date range, such as those that have been consumed within a predetermined period of time (e.g., 30 days, 90 days, 120 days, 1 year, 2 years, etc.).

After the individual taste profiles have been identified, operation 604 is performed to generate a taste profile for the group of users 130 as a whole. The taste profile for the group can be similar to the individual taste profiles and are determined based on the individual taste profiles of each user in the group 130. In one example, the taste profile for the group is computed as an average of the individual taste profile vectors, to generate a group taste profile vector, which is a vector representation of the group taste profile in the multi-dimensional vector space. Other factors or algorithms can also or alternatively be used to generate the group taste profile.

The operation 606 is performed to identify and compile candidate media content items from the media consumption histories of each user, as candidates to be used in the group playlist 120. In some embodiments, the media consumption histories of each user include a list of media content items previously consumed by the respective user.

In one example, the a list of candidate media content items is compiled that contains all of the media content items from the media consumption history of each of the users in the group of users 130. However, if the users have an extensive history, this could result in a very large list. Therefore, in some embodiments the media content items identified from the media consumption history of each user is limited in some way, such as by selecting only a predetermined quantity of the most frequently consumed media content items (e.g., a user's top 100, 500, or 1000 listened to songs), or by selecting only the most recently listened to media content items (e.g., those consumed in the past 30, 60, 90 days, etc.).

In one example, the operation 606 filters the media content items in a user's media consumption history to those consumed within the last six months, and then selects the media content items most frequently consumed by the user over that period of time. Alternatively, additional or different factors can be used to select the users top media content items, such as the frequency of consumption, a frequency that the user skips the items, frequency of the user specifically searching for the media content item, or other factors that identify a track as a favorite by the user. Further examples of identifying and compiling the media content items is described in more detail below with reference to FIG. 9.

Filtering and limiting the number of media content items contained in the list of candidate media content items can greatly decrease the processing time and computer processing required to analyze the media content items.

In some embodiments, additional factors can be applied to identify or remove media content items from the list of candidate media content items. For example, if one or more of the users in the group of users 130 have enabled an explicit filter in their account, then media content items flagged as containing explicit content are not included in the list of candidate media content items. In another example, if a user frequently skips a particular media content item, the skip frequency can be used to eliminate a media content item from the list of candidate media content items for the group.

The operation 608 is performed to analyze the individual media content items from the list of candidate media content items, in preparation for comparing the individual media content items to the taste profile of the group. In one example, a media content item vector is generated for each of the items in the list of candidate media content items. The media content item vector is a vector representation of the media content item in the multi-dimensional vector space, which identifies characteristics of the media content items.

The operation 610 is then performed to compare the media content items in the list of candidate media content items with the taste profile for the group. The comparison determines similarities and differences between the individual media content items and the group taste profile.

As one example, the media content item vector for a particular media content item is compared with the group taste profile vector. The comparison can include multiple factors. One possible factor is a distance between the particular media content item and the group taste profile vector, in the multi-dimensional space. The closer the vectors are together (resulting in a smaller distance between them), the more similar the characteristics of the media content item are to the taste profile of the group of users 130. Correspondingly, the further away they are (resulting in a greater distance), the more dissimilar. Each media content item can be similarly evaluated to provide a means for comparing the media content items of the list of candidate media content items to one another.

In some embodiments, the comparison comprises generating a similarity score for each media content item in the list of candidate media content items. In one example, the similarity score is the distance in the multi-dimensional vector space, where (as discussed above) the lower the score the greater the similarity. In another example, an algorithm is used to compute the score based at least in part on the distance. Examples of suitable algorithms include cosine similarity and cosine distance. The cosine similarity algorithm generates a numerical score on a scale from −1 to +1, where +1 represents a complete similarity between the media content item characteristics and the group taste profile, and −1 represents that the media content item characteristics are completely opposite to the group taste profile. The cosine distance algorithm can be used to compute a score from 0 to 1, where 1 indicates complete similarity, and 0 indicates a complete lack of similarity. The cosine of two (non-zero) vectors can be computed using the Euclidean dot product formula, where the cosine similarity is the product of their lengths times the cosine of an angle between the vectors. An example of the vector comparison and scoring is illustrated and described in further detail herein with reference to FIG. 10. In some embodiments, the similarity score is referred to as a likability score, because it can be used as a measure of an extent to which the group of users is likely to enjoy a media content item.

As noted above, it takes some time and processing power to compute each of the similarity scores, and therefore, by limiting the number of media content items included in the list of candidate media content items in the manners discussed above, the time and processing power requirements are also reduced.

Further, the vector analysis (plotting on a multi-dimensional vector space) provides a much more efficient and direct way of analyzing each media content item and comparing with a group taste profile vector. An alternative technique of performing audio and voice recognition analysis on each media content item each time a comparison is desired, although possible, would be much more complex and time consuming. In the vector analysis, once a media content item vector is generated, the vector can be stored in a database (such as by the vector space application 276, FIG. 2) for future use, and analysis of the raw audio characteristics or lyrics of a media content item is no longer needed, because the information needed to conduct further analysis is contained in the vector representation.

In some embodiments the operation 608 further includes ranking the media content items in the list of candidate media content items based on the comparison. For example, the media content items can be ranked based on the similarity score. In some embodiments the list of candidate media content items are sorted from highest score (most similar) to lowest score (least similar).

The operation 612 is performed to generate the group playlist 120 from the list of candidate media content items based on the comparison performed in operation 610. In some embodiments, the generation of the group playlist 120 includes both selecting media content items and arranging the selected media content items into a particular sequence.

Typically a finite predetermined quantity of media content items is selected for the group playlist 120. The predetermined quantity can be, for example, 100 media content items, or another quantity (e.g., 10, 50, 200, 1000). In some embodiments the predetermined quantity is selected to provide an overall length of play of the playlist 120 that is greater than an estimated maximum length of a gathering of a group of users.

Selection of the media content items can involve, for example, selecting the predetermined quantity of media content items having a highest similarity score as compared with the group taste profile. For example, the top 100 media content items are selected from the list of candidate media content items. Selection can include selecting the first predetermined quantity of media content items when the list of candidate media content items is ranked and sorted according to the ranking.

Some embodiments of operation 612 include an exclusion step, which further requires that a similarity score exceed a predetermined threshold in order to be included in the group playlist. Those that do not exceed the threshold are removed from the list of candidate media content items, and are not selected for inclusion in the group playlist 120. One example of the exclusion threshold is 0.3 on the −1 to +1 cosine similarity scale, such that a media content item with a score of 0.3 or less is excluded from consideration for the group playlist 120. The exclusion step is most likely to be used when one or more users in the group have a limited media consumption history. For example if a particular user has only listened to 5 songs, and 2 of the songs fall below the exclusion threshold, then those two songs will be excluded from consideration even though only 3 songs remain. The exclusion step helps to ensure that the media content items selected for the group playlist have at least a minimum similarity to the group taste profile, and helps to avoid having media content items selected that the group is unlikely to enjoy.

Some embodiments of operation 612 include a user contribution step that operates to select media content items from the listening histories of each of the users of the group of users 130, even if some of the media content items that are selected as a result have a lower similarity score to the group taste profile. This step ensures that, when possible, the group playlist 120 includes contributions of media content items from the listening histories of each of the users in the group of users 130, and in some embodiments ensures that the contribution is uniform from each user.

One example of the user contribution step involves determining a contribution threshold, and choosing not to select additional media content items from a particular user's media consumption history if the inclusion would cause the group playlist 120 to exceed the contribution threshold. An example of the contribution threshold is 50%. With this threshold, the operation 612 does not select more than 50% of the media content items from a particular user's media consumption history for the group playlist 120.

In another possible embodiment, media content items are selected uniformly. For example, the selection can occur iteratively for each user. For a group having four users, the selection process will iteratively select one media content item from each user's media consumption history in turn, starting with user U, then user A, user B, and user C, and then repeating the process until all media content items have been selected. This results in a uniform contribution from the media consumption history of each user. As discussed above, in some cases one or more user listening histories may not have sufficient media content, in which case an exception can be made, for example, by proceeding to selection media content items from only the other users, or by stopping the selection and completing the group playlist 120 with those that have been selected to that point.

In another possible embodiment, if a user does not have sufficient media consumption history, a search can be performed based on the user's taste profile to identify additional content that, although the user may not have consumed it before through the media playback system 100, it is similar to the user's taste profile and therefore likely to be enjoyed by the user. Such items identified in the search can then be used for subsequent contributions for that user.

Some embodiments of operation 612 further include an artist limitation, which applies an artist threshold quantity of media content items that can be selected by a particular artist. The artist limitation step helps to ensure a diversity of artists be included in the group playlist 120. In one example, the artist threshold is in a range from one to 50, or from two to ten. A particular example of the artist threshold quantity is four. In addition, some embodiments also apply an artist sequence limitation, which adjusts the sequence of media content items in the group playlist 120 to prevent a number of media content items from the same artist from being played back-to-back. In some embodiments the artist sequence limitation is applied to distribute the media content items by the same artist so that no two of the media content items are played sequentially, one after the other. Further, in some embodiments a minimum separation threshold identifies a minimum number of media content items that must be arranged between items by the same artist. For example, the minimum number is in a range from about 3 to about 20, or in a range from about 5 to 10, or is exactly 8.

In some embodiments the sequence of media content items is based on the order of selection, such that the first media content item selected is arranged as the first in the sequence, and so on. In some embodiments, the order is adjusted using a sequence adjustment. In some embodiments, the sequence is selected to rotate between contributions from each user.

Figure 7:
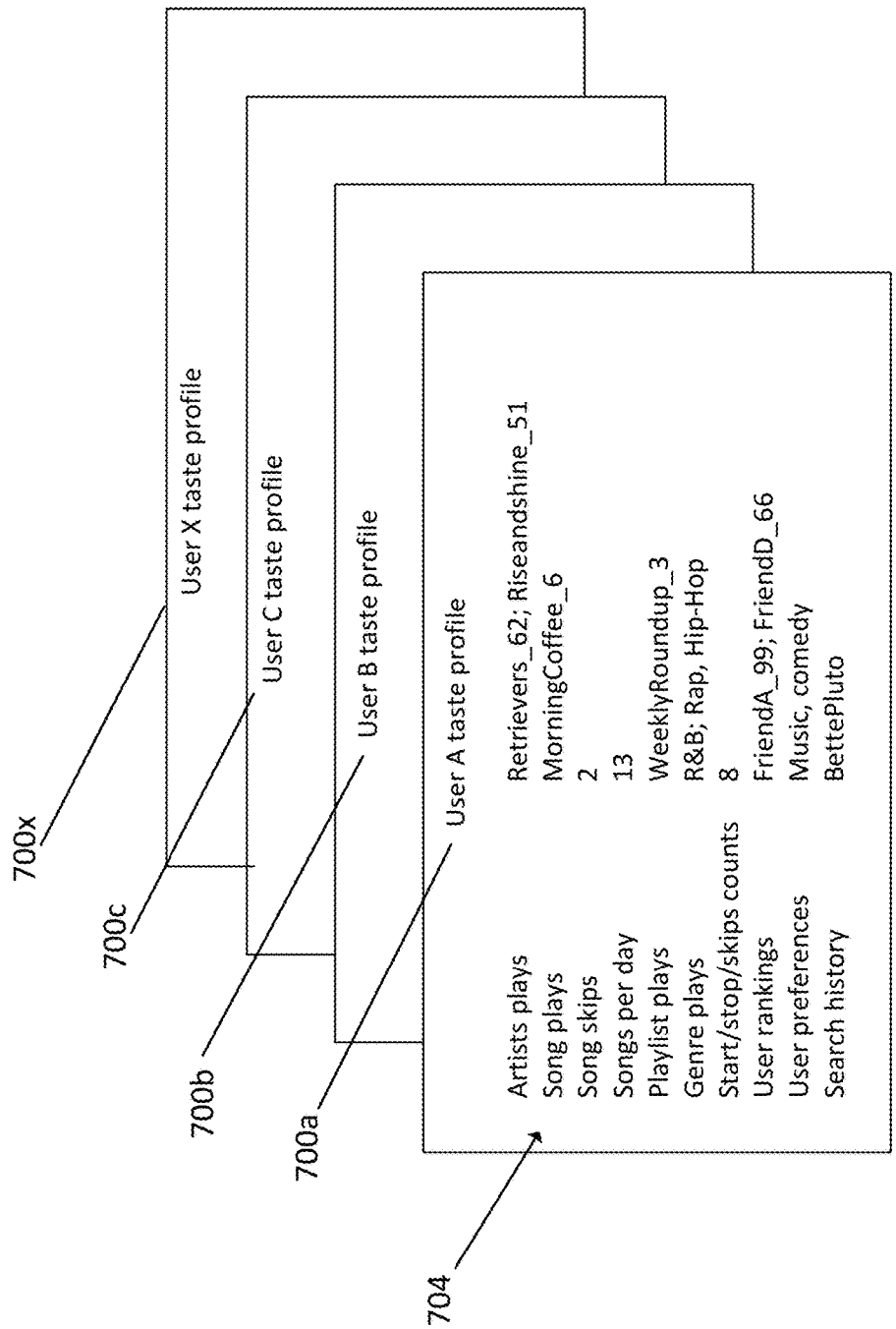
FIG. 7 illustrates examples of user taste profiles.

FIG. 7 illustrates example taste profiles 700 for individual users. Each individual user (user a, b, c, and x) has their own individual taste profile 700*a*, 700*b*, 700*c*, 700*x* which contains a variety of profile data 704.

In some embodiments, each user taste profile is a representation of musical activities, such as user preferences and historical information about the user's consumption of media content, and can include a wide range of information such as artist plays, song plays, skips, dates of listening by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or keywords corresponding to the media, etc.

In addition, the user taste profiles can include other information. For example, the user taste profiles can include libraries and/or playlists of media content items associated with the users. The user taste profiles can also include information about the user's relationships (e.g., connections or friendships) with other users.

A user taste profile can be associated with an individual user and used to maintain an in-depth understanding of the media content consumption activity and preferences of the user, enabling personalized recommendations and taste profiling.

Figure 8:
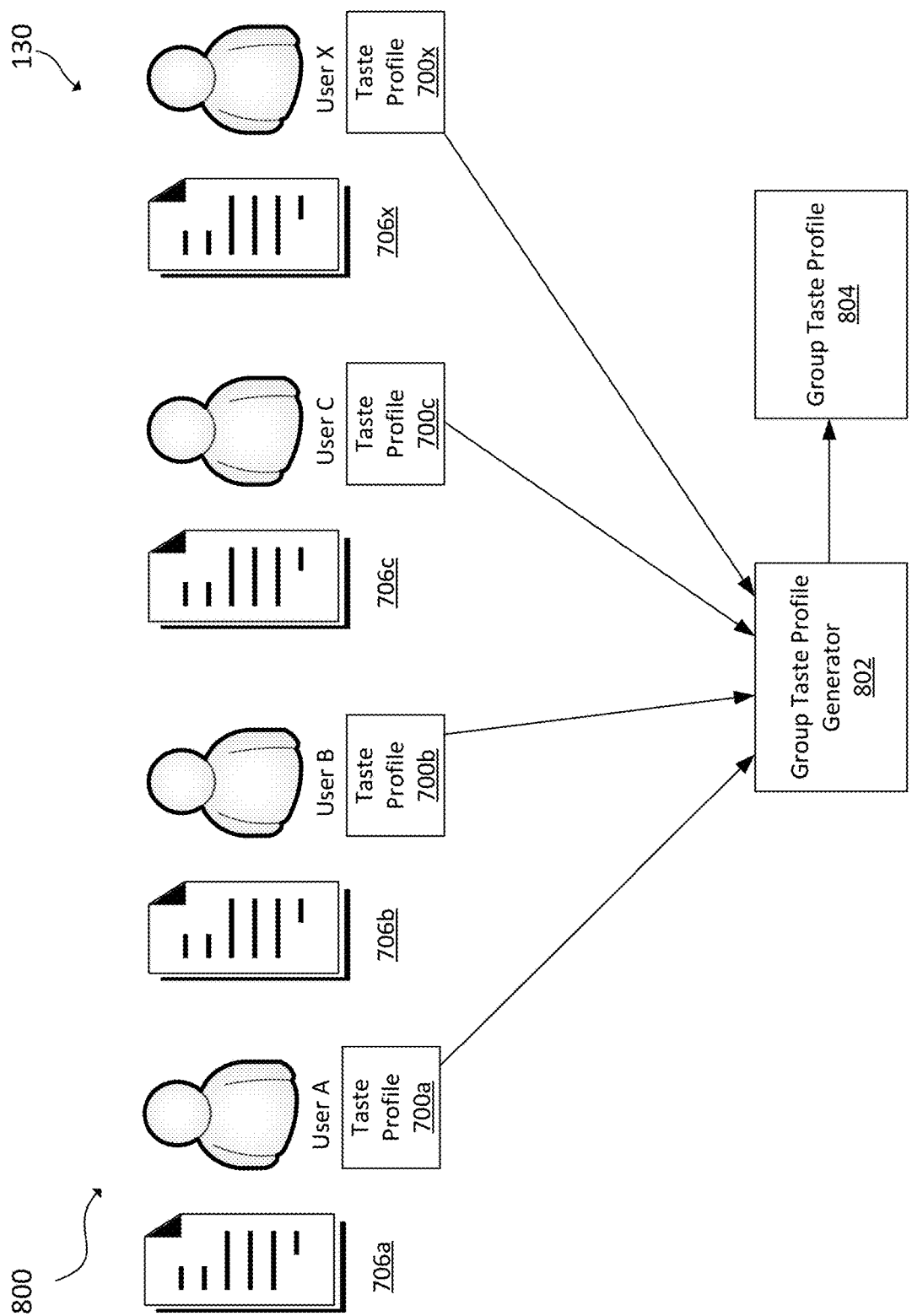
FIG. 8 is a schematic diagram illustrating an example method of generating a group taste profile.

FIG. 8 is a schematic diagram illustrating an example method 800 of generating a group taste profile 804. In this example, the method 800 is performed using a group taste profile generator 802. Also shown in FIG. 8 are the users a, b, c, and x; individual taste profiles 700a, b, c, and x; and media consumption histories 706a, b, c, and x of each user.

In some embodiments, the media delivery system 150 maintains a taste profile database 274, as shown in FIG. 2. The taste profile database 274 can store the individual taste profiles 700a, b, c, and x for each user, and can also include the media consumption histories 706a, b, c, and x for each user. As discussed herein, in some embodiments the individual taste profiles 700a, b, c, and x include taste profile vectors, which are vector representations of the taste profiles in a multi-dimensional vector space.

The group taste profile generator 802 operates to generate a group taste profile 804 for the group 130, based on the taste profiles 700a, b, c, and x of the users in the group 130. In one example, the group taste profile generator 802 identifies each of the individual taste profiles vectors, and computes the average of the individual taste profile vectors, which is then stored as a group taste profile vector. As used herein, the term average can refer to the mean, or other algorithm for computing an average of vectors, such as median, and the like.

In some embodiments the taste profile 700a, b, c, and x of each user is computed based at least in part on the user's media consumption history 706a, b, c, and x. As one example, the taste profile 700a, b, c, and x includes a taste profile vector that is computed as an average of media content vectors associated with the media content items of the user's media consumption history 706a, b, c, and x. Other embodiments can use additional or different factors to compute the taste profile vectors.

In some embodiments the group taste profile generator 802 is part of the group playlist application 270, shown in FIG. 2.

Figure 9:
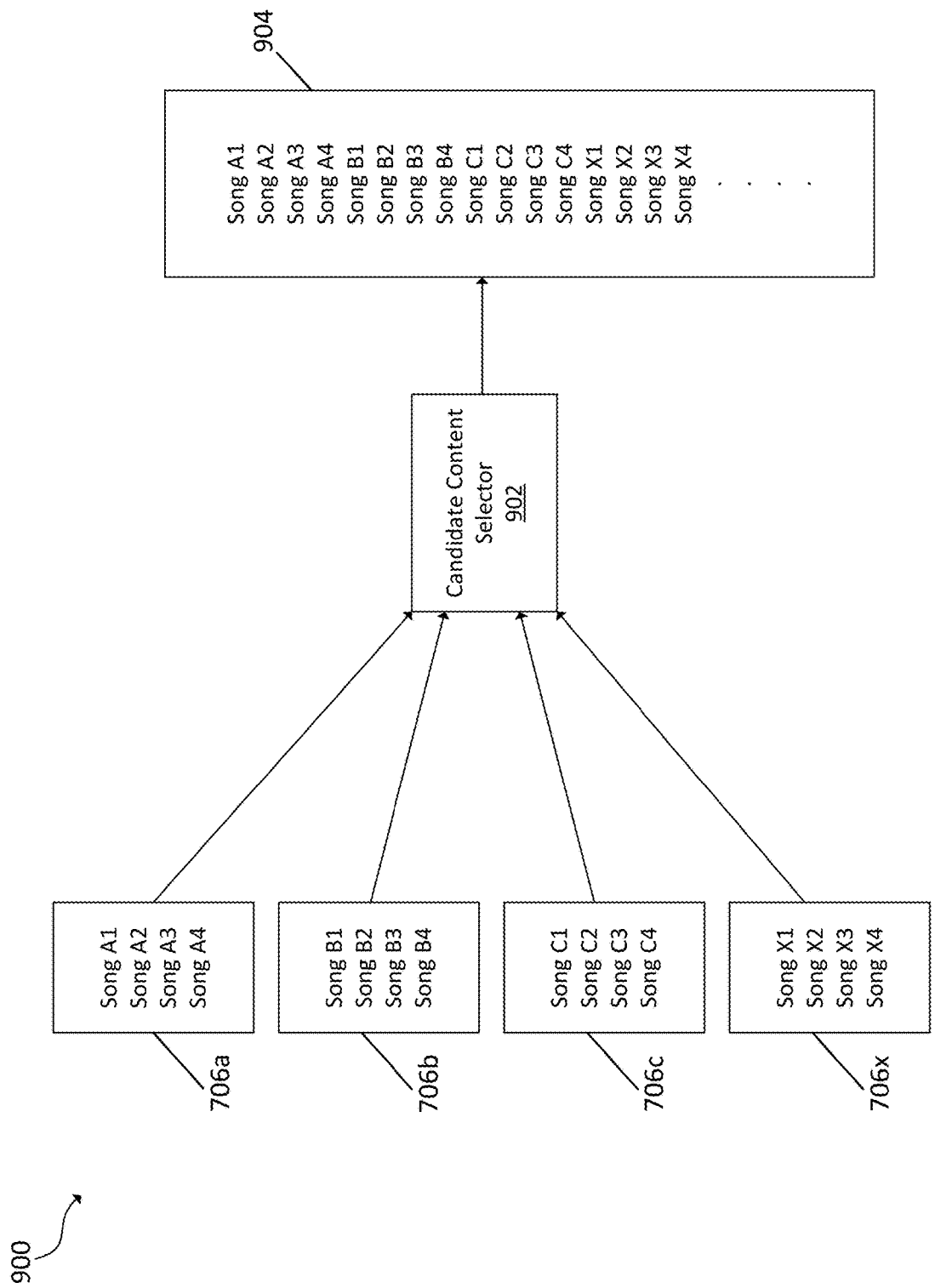
FIG. 9 is a schematic block diagram illustrating an example method of generating a list of candidate media content items.

FIG. 9 is a schematic block diagram illustrating an example method 900 of generating a list of candidate media content items 904. The method 900 is also an example of the operation 606, shown in FIG. 6, that identifies and compiles a list of candidate media content items from media consumption histories of each user. In some embodiments the method 900 is performed by a candidate content selector 902.

In one example, the candidate content selector 902 identifies the media consumption history 706 for each user, and retrieves from the history a subset of the media content items listed therein. The selection is discussed herein in further detail, such as with reference to operation 606.

Once the media content items are selected, the candidate content selector 902 generates the list of candidate media content items 904, that includes a list of the content items that were selected from the media consumption histories 706a, 706b, 706c, and 706x.

Figure 10:
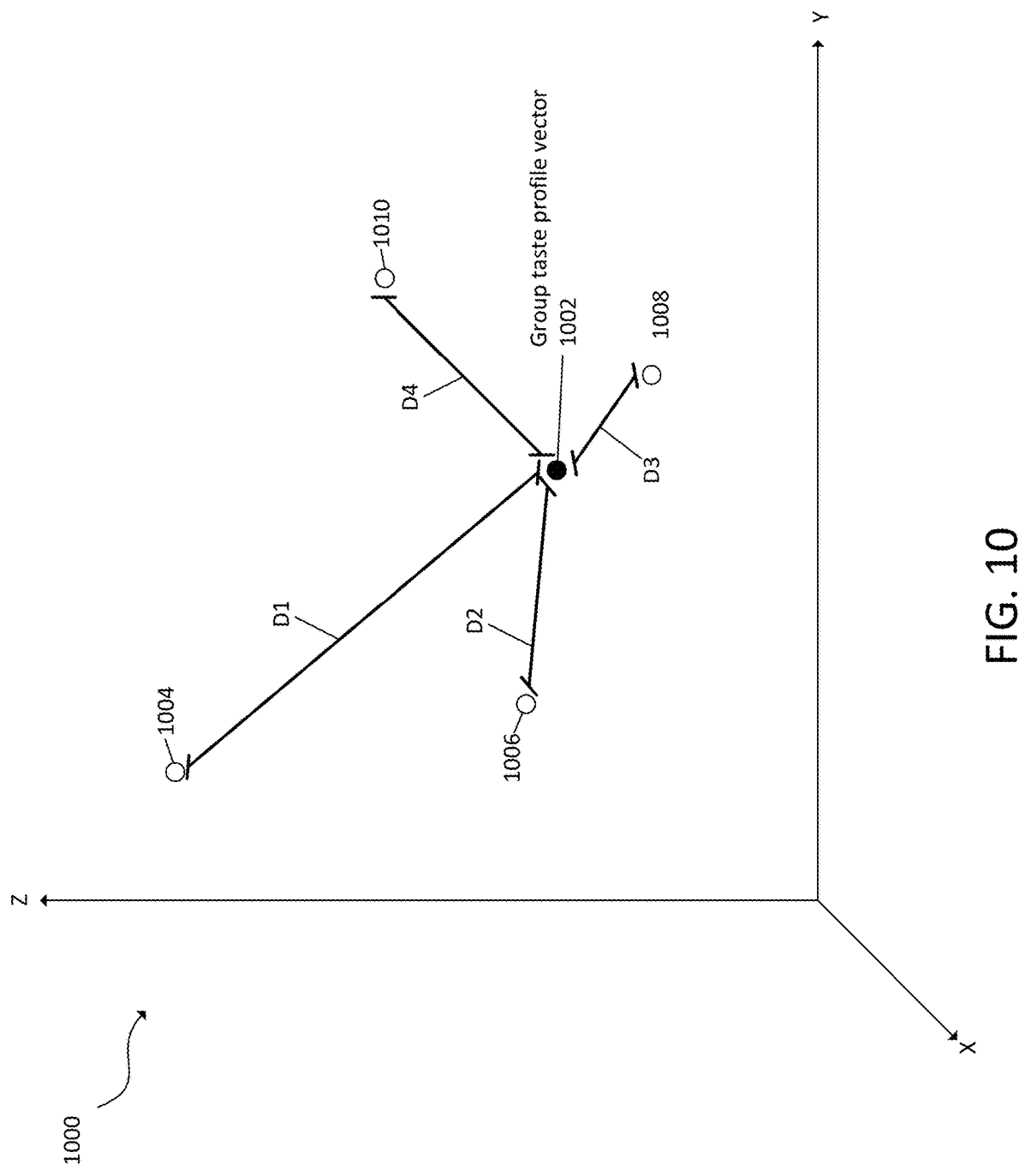
FIG. 10 is a schematic diagram illustrating of an example multi-dimensional vector space and illustrating an example method of analyzing and comparing individual media content items of a list of candidate media content items with a group taste profile.

FIG. 10 is a schematic diagram illustrating of an example multi-dimensional vector space, and illustrating an example method of analyzing and comparing individual media content items of a list of candidate media content items with a group taste profile. The method is an example of operations 608 and 610 shown in FIG. 6.

Although for ease of illustration the example vector space includes three dimensions (x, y, and z), typical vector spaces have more dimensions, such as in a range from 10 to 100 dimensions (e.g., 20 or 40 dimensions). More or fewer dimensions can also be used.

A group taste profile vector 1002 is shown plotted in the multi-dimensional vector space 100, which is a vector representation of the taste profile of the group of users.

An example set of four media content item vectors 1004, 1006, 1008, and 1010 are also shown plotted in the multi-dimensional vector space. The vectors 1004, 1006, 1008, and 1010 are vector representation of the media content item characteristics associated with four media content items included in the list of candidate media content items 904, such as shown in FIG. 9.

To compare the media content items with the group taste profile, distances can be computed between the vectors. In this example, D1 is a distance between the media content item vector 1004 and the group taste profile vector 1002, D2 is the distance between the media content item vector 1006 and the group taste profile vector 1002, D3 is the distance between the media content item vector 1008 and the group taste profile vector 1002, and D4 is the distance between the media content item vector 1010 and the group taste profile vector 1002. Further, in this example D3<D2<D4<D1. Therefore, the media content item associated with vector 1008 has the most similarity to the group taste profile vector 1002 (and group taste profile) because the distance D3 is the shortest, whereas the media content item associated with vector 1004 has the least similarity to the group taste profile vector 1002 (and group taste profile) because the distance D1 is the longest.

As discussed herein, in some embodiments the distances D1, D2, D3, and D4 are used to generate a similarity score.

Figure 11:
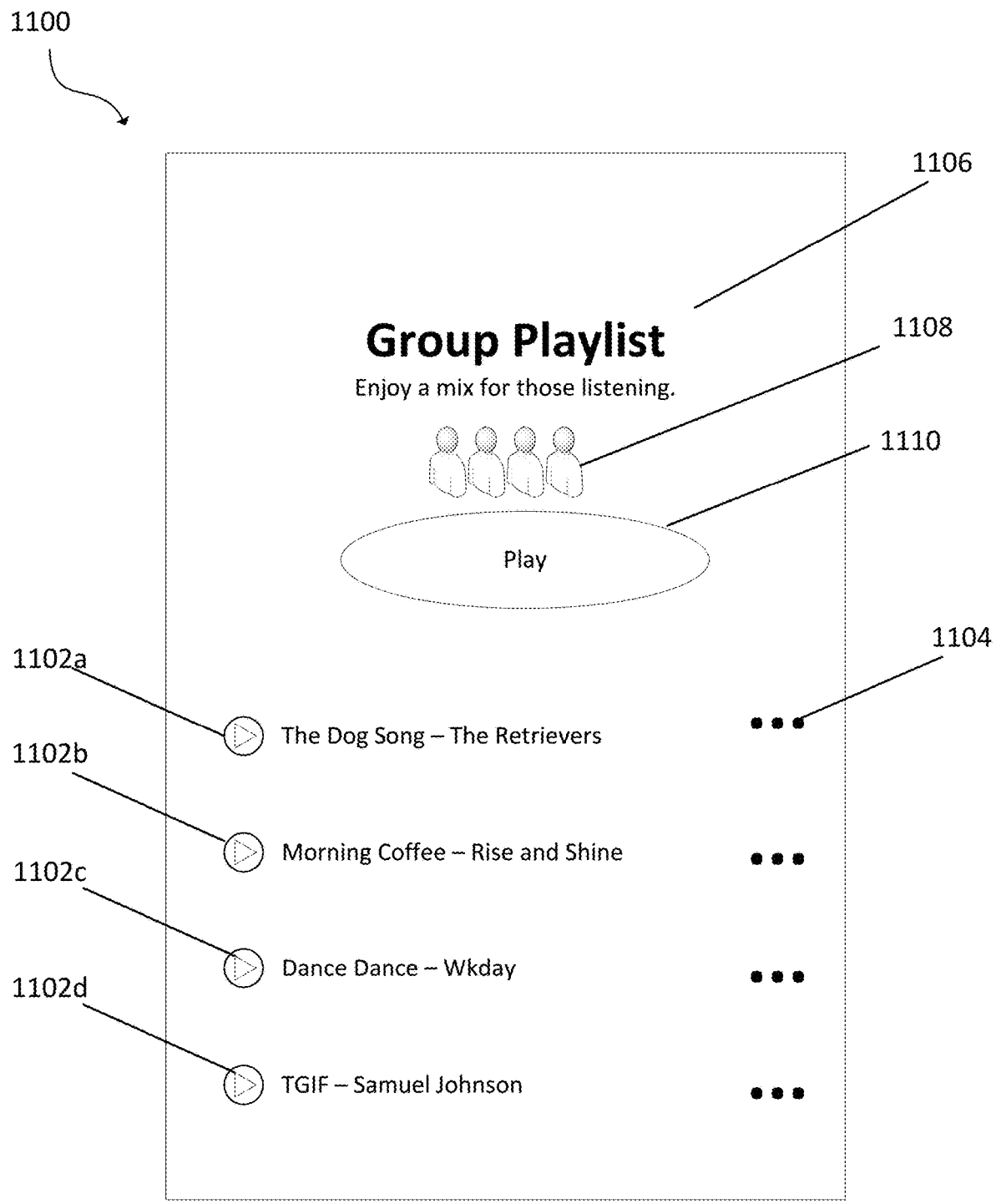
FIG. 11 illustrates an example user interface for displaying and playback of the group playlist.

FIG. 11 illustrates an example user interface 1100 for displaying and playback of the group playlist 120, such as can be generated and displayed by the media playback device 102. In this example, the group playlist 120 includes a list of tracks, including tracks 1102a, 1102b, 1102c, 1102d. In addition, the user interface 1100 may include an overflow menu 1104 that allows a user to save songs, identify songs as favorites, or remove songs. Alternatively, a user is able to swipe left or right to save songs that are in the playlist, so the user can easily find the song again. Users can also favorite or ban a song. A play button 1110 can be selected to begin playback of the group playlist 120.

The example user interface 1100 also includes a display of the playlist title 1106 (e.g., "Group Playlist") and icons 1108 representing each of the users of the group of users 130. In some embodiments the icons 1108 are images from the profile of each user, which can include for example a picture of the user, or other image selected by the user. The icons 1108 allow the user to quickly see and identify the users in the group of users 130 for which the group playlist 120 was made. In some embodiments the icons 1108 are selectable to display the list of the users.

Once the play button 1110 is selected the tracks 1102a, b, c, and are played in order. The display can update as tracks are played to show additional tracks in the group playlist 120. In some embodiments the user interface is scrollable to view additional tracks as well, such as by swiping up or down, or clicking and dragging up or down.

Some embodiments include a shuffle play option to allow the media content items of the group playlist 120 to be played in a randomized order.

The operations and processes described herein can be performed by the cooperation of two or more devices, systems, processes, or combinations thereof.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method of generating a playlist of media content items for a group of users, the method comprising:
displaying a user interface via a media playback device associated with a user of a media streaming service, the user interface including a list of users of the media streaming service, wherein each user in the list is selectable for inclusion in the group of users; and
responsive to receiving an input from the user identifying a selected user to be included in the group of users:
determining a first user taste profile of the user and a second user taste profile of the selected user;
generating a group taste profile based on at least the first and second user taste profiles;
generating a list of candidate media content items selected from at least a user media consumption history of the first user and a media consumption history of the selected user;
comparing the group taste profile with the candidate media content items in the list of candidate media content items;
ranking the list of candidate media content items based on the comparison; and
generating a playlist selected from the ranked list of candidate media content items.

2. The method of claim 1, further comprising computing a similarity score for each of the candidate media content items in the list of candidate media content items.

3. The method of claim 2, wherein ranking the list of media content items is based on the similarity score.

4. The method of claim 2, wherein generating the playlist further comprises selecting only media content items having a similarity score that exceeds an exclusion threshold.

5. The method of claim 1, wherein generating the group taste profile based on at least the first and second user taste profiles comprises computing an average of at least the first and second user taste profiles.

6. A computer-implemented method of generating a playlist of media content items for a group of users, the method comprising:
displaying a user interface, via a media playback device associated with a user of a media streaming service, the user interface including a list of users of the media streaming service, wherein each user in the list is selectable for inclusion in the group of users; and
responsive to receiving an input from the user identifying a selected user to be included in the group of users:
determining a first user taste profile of the user and a second user taste profile of the selected user;
generating a group taste profile based on at least the first and second user taste profiles;
generating a list of candidate media content items;
comparing the group taste profile and the candidate media content items in the list of candidate media content items;
ranking the list of candidate media content items based on the comparison; and
generating a playlist selected from the ranked list of candidate media content items.

7. The computer-implemented method of claim 6, wherein the list of users comprises users of the media streaming service in proximity to the user.

8. The computer-implemented method of claim 7, wherein the list of users of the media streaming service in proximity to the user are identified using any one of (i) determining the users are within a wireless communication range, (ii) a location-determining device, or (iii) a combination of (i) and (ii).

9. The computer-implemented method of claim 6, wherein the list of users comprises users of the media streaming service gathered virtually with the user.

10. The computer-implemented method of claim 6, wherein the first user taste profile comprises the likes and dislikes of the user and the second user taste profile comprises the likes and dislikes of the selected user.

11. The computer-implemented method of claim 6, wherein:
the first user taste profile comprises a listening history of the user limited to a time range; and
the second user taste profile comprises a listening history of the selected user limited to the time range.

12. The computer-implemented method of claim 6, wherein the list of candidate media content items comprises a predetermined quantity of the most frequently consumed media content items of the user and a predetermined quantity of the most frequently consumed media content items of the selected user.

13. The computer-implemented method of claim 12, wherein the list of candidate media content items comprises the most frequently consumed media content items of the and the selected user that have been consumed during a period of time.

14. The computer-implemented method of claim 6, wherein ranking the list of candidate media content items is based on any one of (i) a frequency of consumption, (ii) a frequency of user skips, (iii) a frequency of searching, or (iv) any combination of (i), (ii), and (iii).

15. The computer-implemented method of claim 6, wherein:
the list of candidate media content items comprises media content items from a listening history of the user and a listening history of the selected user; and
generating the playlist selected from the ranked list of candidate media content items comprises including a media content item from the listening history of the user and a media content item from the listening history of the selected user.

16. A computer-implemented method of generating a playlist of media content items for a group of users, the method comprising:
displaying a user interface on a media playback device associated with a user of a media streaming service, wherein the user interface includes a plurality of selectable options that control the generation of a group playlist, the plurality of selectable options including an option to select users to be included in the group of users and an option to automatically select users to be included in the group of users;
receiving a selection of one of the plurality of selectable options; and
responsive to receiving the selection:
identifying a selected user to be included in the group of users based on the selection of one of the plurality of selectable options;
determining a first user taste profile of the user and a second user taste profile of the selected user;
generating a group taste profile based on at least the first and second user taste profiles;
generating a list of candidate media content items;
comparing the group taste profile and the candidate media content items in the list of candidate media content items;

ranking the list of candidate media content items based on the comparison; and generating a playlist selected from the ranked list of candidate media content items.

17. The computer-implemented method of claim 16, wherein, when the selection is the option to select users to be included in the group of users, identifying the selected user comprises:

displaying an additional user interface on the media playback device, wherein the additional user interface includes a list of users of the media streaming service, wherein each user in the list is selectable to be included in the group of users; and receiving a selection from the list identifying the selected user.

18. The computer-implemented method of claim 16, wherein, when the selection is the option to automatically select users to be included in the group of users, identifying the selected user comprises selecting the selected user based on a proximity of the selected user to the user.

19. The computer-implemented method of claim 18, wherein the proximity of the selected user is identified using any one of (i) determining the selected user is within a wireless communication range, (ii) a location-determining device, or (iii) a combination of (i) and (ii).

20. The computer-implemented method of claim 16, wherein, when the selection is the option to automatically select users to be included in the group of users, identifying the selected user comprises selecting the selected user based on the user and the selected user participating in a virtual gathering.

* * * * *